United States Patent [19]
Geier et al.

[11] Patent Number: 6,134,484
[45] Date of Patent: Oct. 17, 2000

[54] METHOD AND APPARATUS FOR MAINTAINING THE INTEGRITY OF SPACECRAFT BASED TIME AND POSITION USING GPS

[75] Inventors: George Jeffrey Geier, Scottsdale; Roger Charles Hart, Gilbert; Gaylin David Brenchley, Mesa, all of Ariz.

[73] Assignee: Motorola, Inc., Schaumburg, Ill.

[21] Appl. No.: 09/493,482

[22] Filed: Jan. 28, 2000

[51] Int. Cl.[7] .............................. G01S 5/02; H04B 7/185
[52] U.S. Cl. ........................ 701/13; 701/3; 701/213; 701/214; 701/215; 342/357.06; 342/357.12; 342/357.15; 73/178 R; 455/8; 455/12.1
[58] Field of Search ............................... 701/13, 3, 200, 701/213, 214, 215; 342/357.06, 357.12, 357.15; 73/178 R; 455/8, 9, 12.1

[56] References Cited

U.S. PATENT DOCUMENTS 5,583,744  12/1996  Diesel ........................................ 364/443
5,825,326  10/1998  Semler et al. ...................... 342/357.04
5,923,286   7/1999  Divakaruni .............................. 701/213

OTHER PUBLICATIONS

An article entitled "A Baseline GPS RAIM Scheme And a Note on the Equivalence of Three RAIM Methods", by R. Grover Brown, Iowa State University, Ames, Iowa, 1992 from the Navigation: Journal of The institute of Navigation.

*Primary Examiner*—William A Cuchlinski, Jr.
*Assistant Examiner*—Yonel Beaulieu
*Attorney, Agent, or Firm*—Frank J. Bogacz

[57] ABSTRACT

A method and apparatus for maintaining the integrity of spacecraft based time and position using GPS (11) is disclosed. A GPS receiver is provided with a Receiver Autonomous Integrity Monitor (RAIM) processor (12) and a Kalman filter (14). GPS signals are received from at least four GPS satellites and processed in the GPS receiver to provide time and position information. Periodically, an extended fault vector is formed in the Kalman filter with propagated open-loop position and velocity measurements. The extended fault vector is used to isolate and remove failing GPS satellites.

10 Claims, 2 Drawing Sheets

METHOD AND APPARATUS FOR MAINTAINING THE INTEGRITY OF SPACECRAFT BASED TIME AND POSITION USING GPS

FIELD OF THE INVENTION

This invention relates to a method and apparatus for maintaining the integrity of precise time and position derived from GPS. More particularly, the present invention relates to method and apparatus for isolating GPS satellite failure and removing the satellite from the time and position computations more quickly and reliably.

BACKGROUND OF THE INVENTION

As more and more spacecraft and communications systems rely on the Global Positioning System (GPS) for their timing source, it is clear that the reliability of the spacecraft or communications link is a function of the entire GPS system. Even though GPS has demonstrated superb reliability and availability, a few operational glitches have occurred that affected the time and position solutions (i.e. the time and position output). At least one of these has contributed to a complete shutdown of a prototype TDMA system until the problem was cleared by the GPS Control Segment some 30 minutes later (the affected satellite was set unhealthy). A major and somewhat unadvertised flaw in the GPS system design is that there is no apparent way for the Control Segment to immediately remove a bad satellite from the constellation, the process time to do so is typically between 5 and 45 minutes.

Many spacecraft orbiting the earth use information derived from GPS for navigation and/or to maintain them in their specific orbit. A spacecraft using GPS for navigation includes a GPS receiver with a plurality of channels (12 or more), each dedicated to tracking a different GPS satellite. Generally, the spacecraft is moving in an orbit or path different than the satellites in the GPS constellation which means that the GPS satellites being tracked are continuously changing The detection of failed GPS satellites is generally limited by the presence of Selective Availablity (SA). As is well known by experienced GPS users, SA, imposed on civil users by the Department of Defense, severely limits navigation accuracy. In addition, it also limits conventional methods of failure detection as, for example, referenced in Brown, "A Baseline RAIM Scheme and a Note on the Equivalence of Three RAIM Methods", *Journal of the Institute of Navigation*, Fall 1992. The fundamental limitation imposed by SA limits failure detection to error magnitudes which are large in comparison to SA. However, information provided by a failed or failing GPS satellite can seriously affect the navigation of a spacecraft relying on GPS information.

In U. S. Pat. No. 5,583,774, issued Dec. 10, 1996 and entitled "Assured-Integrity Monitored-Extrapolation Navigation Device", an integrity monitor is developed for GPS using sensor augmentation. In this device, an Inertial Navigation System (INS) is used to maintain a highly accurate trajectory for a period of time sufficiently long (e.g. 30 minutes) to enable isolation of failed satellites by the GPS Control Segment. A bank of Kalman filters, using the GPS-calibrated INS as a reference trajectory, is used to estimate a range bias for each satellite, which is used to confirm its health. Only satellites passing this health test can be used in the calibration. The major problem with this system is the need for external sensors and banks of Kalman filters, which greatly increases the size and complexity of the system.

Accordingly, it is highly desirable to provide a method and apparatus which is capable of quickly and reliably isolating and removing failed or failing GPS satellites from the GPS position and time calculations used in navigation of a spacecraft.

BRIEF DESCRIPTION OF THE DRAWINGS

Referring to the drawings.

DESCRIPTION OF THE PREFERRED EMBODIMENT

Spacecraft relying on the Global Positioning System (GPS) for navigation (e.g. position and time) informnation include a GPS receiver having a plurality of channels, each of which tracks a different GPS satellite transmission. Generally, the GPS receiver signal processing function acquires and tracks all of the GPS satellites within view. For each GPS satellite which is tracked, pseudo range and carrier phase measurements are generated, in addition to the demodulated data which constitutes the ephemeris for each GPS Satellite and enables calculation of the position and velocity of the spacecraft.

The set of available pseudo ranges and the set of available delta ranges (computed from differenced carrier phase data) are input to a Receiver Autonomous Integrity Monitor (RAIM) processor, in addition to the satellite positions computed from the ephemeris. RAIM algorithms allow the GPS receiver to automatically detect and perhaps isolate and remove failed GPS satellites from inclusion in the resulting GPS position and time solution.

Kalman filters, developed in the 1960s, have been used extensively in navigation and are well known in the art. The Kalman filter is a recursive algorithm that uses physical observations (Doppler, range, angles, etc.) to obtain an optimal estimate of desired navigation parameters. The key attraction of the Kalman filter is that it depends only on the previous navigation update, requiring little processing time and storage at each update and is thus, well suited to real-time applications in embedded microprocessors. In maintaining precise position and time accuracy in orbiting applications, a Kalman filter algorithm is used to reduce the nominal errors in the GPS measurements. The Kalman filter utilizes a high precision model of the spacecraft orbital dynamics, which permits it to filter the long time constant error variations from SA. Because the resultant filtered accuracy is significantly improved relative to nominal, unfiltered GPS position and timing accuracy, ensuring that the requirements are kept when GPS satellites fail represents a challenge for the design of a RAIM algorithm.

In spacecraft such as that being discussed herein, the Kalman filter was designed to remove the errors induced by Selective Availability (SA) using a detailed model for the spacecraft orbital and maneuver dynamics and already provides a measure of isolation from GPS satellite failures. The Kalman filter residual test, when implemented as the usual "three sigma" test, should be effective in screening measurements from GPS satellites which have failed, i.e. whose errors are already large relative to the normal expected error levels from SA. However, the Kalman filter residual test may not be effective in detecting a failing satellite, i.e., one which is slowly drifting to a large error condition, as the Kalman filter may absorb some of the error in its estimates and so not be able to detect it in its residuals.

Figure 1:
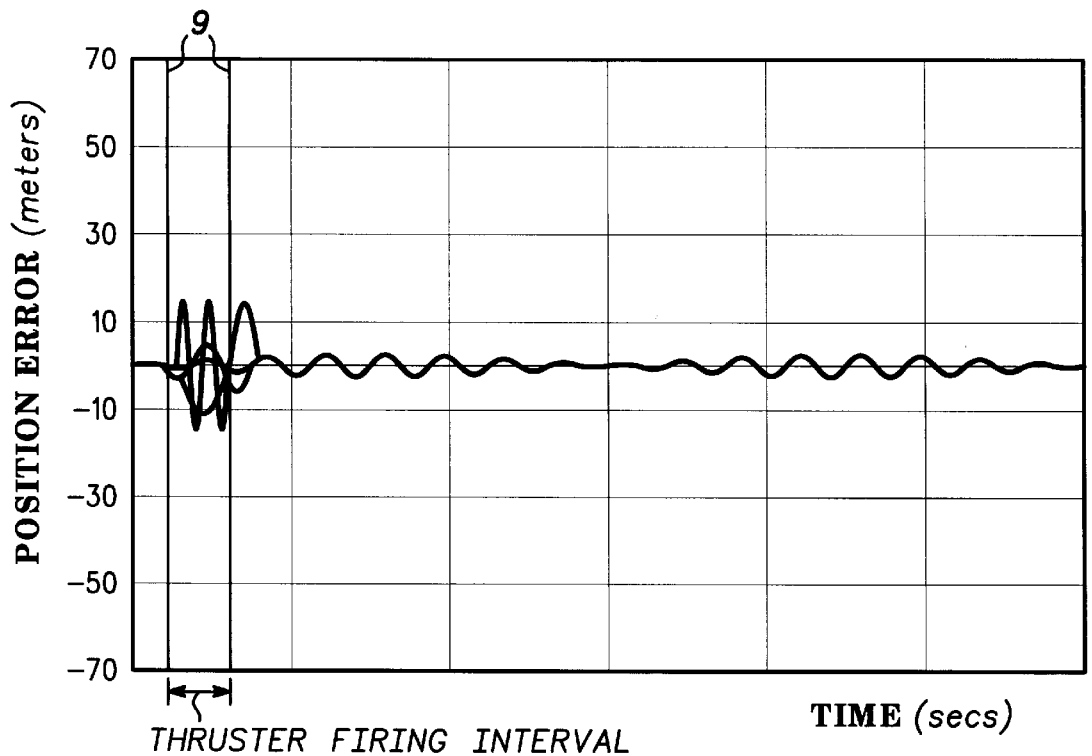
FIG. 1 is a graphical representation of "along track position error" for nominal GPS conditions.
Figure 2:
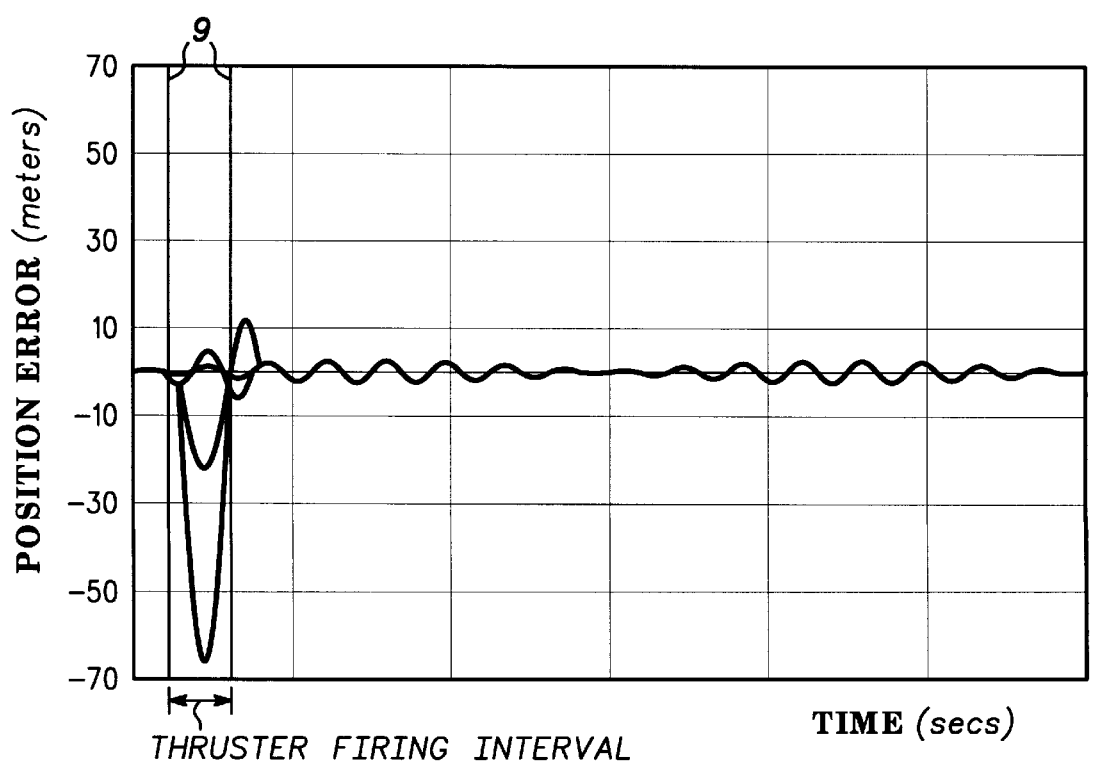
FIG. 2 is a graphical representation of "along track position error" for a simulated GPS satellite failure.

Simulations have indicated that the Kalman filter solution can exhibit relatively large error transients when a GPS satellite failure occurs during a maneuver period of the spacecraft. Referring to FIG. 1, a graphical representation of "along track position error" for nominal GPS conditions is illustrated. Position error in meters is represented along the vertical axis and time in seconds is represented along the horizontal axis. Here it can be seen that minor perturbations or transients in position, with properly operating GPS satellites, are quickly compensated by either the RAIM processor or the Kalman filter, resulting in a peak error of roughly 15 meters. The transient errors induced in the system, illustrated at the beginning of the graphs of FIGS. 1 and 2, are caused by a spacecraft thermister firing (a very low level, but persistent ion thernister). The thermister firing occurs during the interval spanned by the two vertical lines, designated 9, on each of FIGS. 1 and 2.

Referring to FIG. 2, a graphical representation of "along track position error" for a simulated GPS satellite failure is illustrated. In this example, the error transient in the along-track direction from the GPS satellite failure is ramping at a rate of 0.05 m/sec resulting in a peak error of nearly seventy meters. A marriage of the RAIM processor and the Kalman filter, which will be explained in more detail presently, is used in the preferred embodiment of the present invention to reduce the magnitude of the transients.

Figure 3:
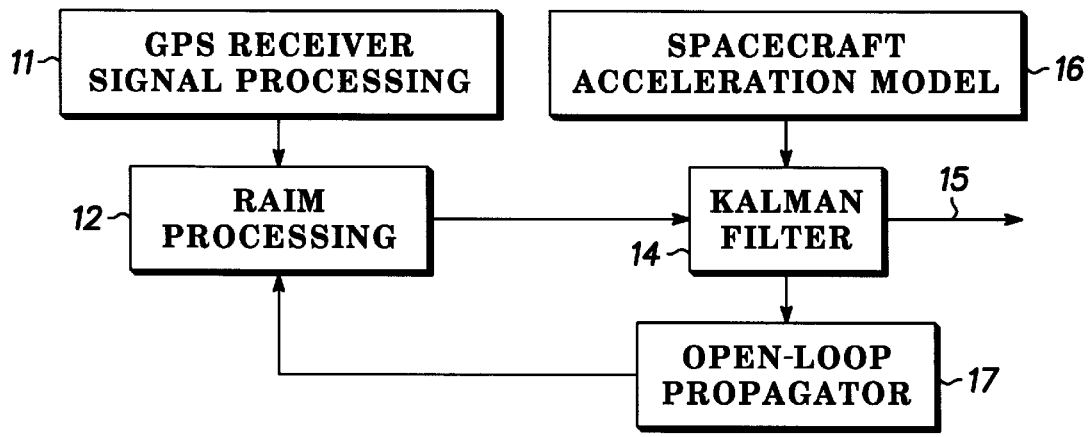
FIG. 3 is a block diagram illustrating major processing blocks of apparatus for maintaining the integrity of spacecraft based time and position using GPS in accordance with the present invention.

Turning now to FIG. 3, a block diagram is illustrated showing major processing blocks of apparatus 10 for maintaining the integrity of spacecraft based time and position using GPS in accordance with the present invention. Here it should be noted that while separate blocks are illustrated for the various functions, all of the processing functions can be performed in a single processor embedded in the GPS receiver. Apparatus 10 includes a standard space borne GPS receiver 11, which is connected to supply GPS time and position signals to a RAIM processor 12. RAIM processor 12 supplies signals to a Kalman filter 14, which has an output 15 on which it supplies the navigation information. Additionally, a spacecraft acceleration model 16 supplies information to Kalman filter 14 and an open loop propagator receives processed information from the Kalman filter and supplies continuous position information to RAIM processor 12.

Basically, GPS receiver signal processing 11 acquires and tracks the GPS satellites within view in a well known manner. For each GPS satellite which is tracked, pseudo range and carrier phase measurements are generated, in addition to the demodulated data which constitutes the ephemeris from each GPS satellite and enables calculation of the position and velocity of the spacecraft.

The set of available pseudo ranges and the set of available delta ranges (computed from differenced carrier phase data) are input to RAIM processing 12, in addition to the GPS satellite positions computed from the ephemeris. RAIM processing 12 performs two distinct sets of calculations. A first set of calculations is designed to reduce the impact of a GPS satellite with a slowly developing failure condition (e.g. a GPS satellite clock which is drifting abnormally). A second set of calculations is designed to isolate and remove the failed GPS satellite from further processing by Kalman filter 14. In the first set of calculations, fault vectors are used to compute the "a posteriori statistic of unit variance" or "unit variance" in the parlance of statistics. This statistic is a measure of how the measurement set (whether pseudo ranges or delta ranges) conforms to its expected error statistics, a value less than or equal to unity implies that the measurement error variance is set conservatively. As the unit error variance becomes larger, however, there is greater evidence that off-nominal error conditions exist and it is , therefore, used to scale up the error variances assumed by Kalman filter 14. In this way, Kalman filter 14 is desensitized to off-nominal error conditions (i.e., including a failed satellite).

Figure 4:
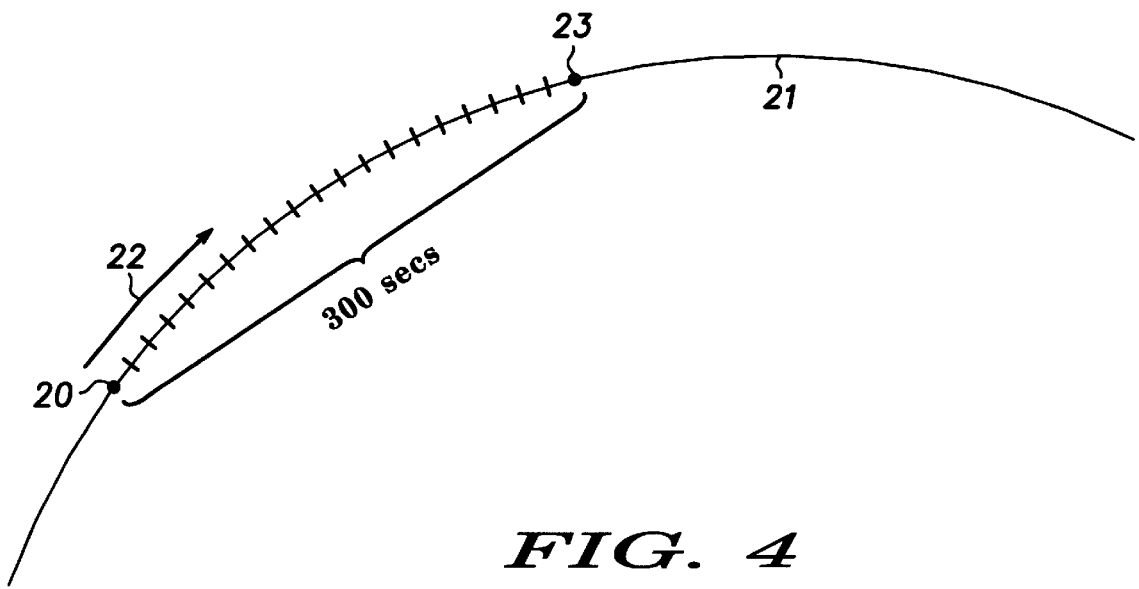
FIG. 4 is an orbital diagram illustrating the operation of the apparatus of FIG. 3.

Referring additionally to FIG. 4, an orbital diagram showing the operation of the apparatus of FIG. 3 is illustrated. In this specific example, apparatus 10 is carried by a spacecraft at a position designated 20 in an orbit 21. During the period of time (300 seconds) from spacecraft position 20 to spacecraft position 23, an "open-loop" propagation of the estimated spacecraft position and velocity is performed. These "open-loop" estimates are independent of the GPS pseudo range and carrier phase measurements generated by the GPS receiver during the time interval. The second set of calculations in apparatus 10 forms an "extended" fault vector, formed using pseudo and delta range measurements generated by the receiver at spacecraft position 23, and the open-loop position and velocity. Here it should be understood that FIG. 4 simply illustrates an instantaneous example and, as the spacecraft moves from one position (e.g. position 20) to the next position (e.g. position 23), the next open-loop position and extended fault vector is computed. The extended fault vector (and all of the following vectors) is used to isolate failed pseudo range and/or delta range measurements and remove them from further processing. During the open-loop propagation, the normal measurement processing steps of the Kalman filter, indicated by time ticks 22 (nominally occurring every 10–30 seconds), continue.

The extended fault vector augments the GPS-only pseudo range and delta range measurement sets with position and velocity estimates propagated open-loop (i.e. without processing GPS measurement data) from Kalman filter 14 estimated position and velocity, using spacecraft acceleration model 16. The period of the open-loop propagation (i.e. the time interval between spacecraft positions 20 and 23 in FIG. 4) is the minimum time interval required to effectively decorrelate the open-loop position and velocity errors from the set of pseudo range and delta range measurement errors. Since Selective Availability (SA) is the dominant error source for GPS Standard Positioning Service (SPS) receivers, an interval of roughly 300 seconds (three SA time constants) is appropriate. Thus, an open-loop propagation is initiated every five minutes from the current best estimate of the trajectory maintained by Kalman filter 14 and used to construct the extended fault vectors (one for the set of pseudo ranges and propagated position and a second for the set of delta ranges and propagated velocity). The open-loop propagation process operates in parallel with the normal Kalman filter algorithm with the only interaction, other than the initialization, being through the action of the extended fault vector. The extended fault vector is then used as a conventional fault vector to support failure isolation. Since the susceptibility of Kalman filter 14 to failures that have not been isolated is reduced by the deweighting in response to the unit variance calculation, the extended fault vector calculations can be done at a reduced rate.

In the operation of apparatus 10, GPS receiver 11, RAIM processor 12 and Kalman filter 14 continuously process GPS information to compensate for transients and the like, generally as illustrated in FIG. 1. The combination of RAIM processor 12 and Kalman filter 14 generally isolates and removes failed GPS satellites from the process. However, this combination may still be slow in isolating and removing failing satellites which are slowly drifting to a large error condition. Therefore, in this preferred embodiment very accurate predicted position information is simultaneously provided using orbital acceleration information from the Kalman filter through the use of the extended fault vector. The method includes two features: computation of an extended fault vector for use in the RAIM algorithm for satellite failure detection and isolation; and parallel use of the RAIM algorithm outputs to de-weight potentially faulty satellites in the Kalman filter solution as the satellites failure develops (i.e. prior to failure isolation). The extended fault vector concept augments the usual (GPS only) fault vector with position information predicted using the orbital acceleration information from Kalman filter 14. This additional information enhances the failure detection properties of the RAIM algorithm so that GPS satellite failures are isolated and removed more quickly and reliably. Also, contamination of the Kalman filter before a failing GPS satellite is removed from consideration by the RAIM algorithm or the Kalman filter residual test is prevented as the failure develops and is not yet isolated, by using the RAIM algorithm outputs to de-weight possible failed GPS satellites and scaling the error variances which Kalman filter 14 assigns to them.

The following description of apparatus 10 first describes the use of the RAIM function in adjusting the assumed error variances in Kalman filter 14 and then describes the computation of the external fault vector. The fault vector, f, can be derived from a redundant set of equations in a procedure described in two articles: a first by Sturza, M. A. and entitled "NAVIGATION SYSTEM INTEGRITY MONITORING USING REDUNDANT MEASUREMENTS", in the *Journal of the Institute of Navigation*, Vol. 35, No. 4, Winter 1988–89; and a second by Geier, G. J., et al. entitled "THE APPLICATION OF INTEGRITY MONITORING TO OFF-SHORE SEISMIC SURVEY OPERATIONS" in the *Journal of the Institute of Navigation*, Vol. 39, No. 3, Fall 1992, both of which are incorporated herein by reference. The dimension of fault vector f is equal to the number of measurements. Also, it should be noted that separate fault vectors are computed, using equations (1) and (2) below, for the set of redundant pseudo ranges and the set of redundant delta ranges.

$$f = SR^{-1/2} z \quad (1)$$

$$S = I - R^{-1/2} H (H^T R^{-1} H)^{-1} H^T R^{-1/2} \quad (2)$$

where:
S is the fault vector covariance matrix;
R is the pseudo (or delta) range measurement error covariance;
H is the gradient matrix corresponding to the redundant measurement set; and
I is the identity matrix.

The unit variance, u, is found directly from f:

$$u = f^T f / n_{DOF} \quad (3)$$

where:
T denotes vector transpose; and
$n_{DOF}$ is the number of degrees of freedom.

The number of degrees of freedom above is simply the number of measurements in excess of the number of unknowns (four for position and velocity determination with GPS). Given that a unit variance has been computed separately for the set of pseudo ranges (PR) and delta ranges (DR), the following tests are applied to each:

$$\text{if}(u_{PR} > T_{PR}) \sigma^2_{PR} = u_{PR} \sigma^2_{PR} \quad (4)$$

$$\text{if}(u_{DR} > T_{DR}) \sigma^2_{DR} = u_{DR} \sigma^2_{DR} \quad (5)$$

where:
$\sigma^2_{PR}$ and $\sigma^2_{DR}$ are the variances used by the Kalman filter.

The thresholds which control the operation of the de-weighting, $T_{PR}$ and $T_{DR}$, can be set based on an allowable false alarm rate. Generally, low false alarm rates are desirable, subject to tolerable probabilities of missed detection. However, the penalty to performance associated with a false alarm is insignificant in this application, since the spacecraft acceleration model 16 used by Kalman filter 14 is highly accurate. Therefore, a relatively low threshold can be used and will minimize the impact of failing satellites.

In addition to the de-weighting described above, the extended fault vector is constructed (at a lower rate). As described previously, every five minutes, an open-loop propagation from the Kalman filter estimated position and velocity is initiated. A highly numerical integration method (e.g. fourth order Runge-Kutta) is used to reduce the numerical error to insignificant levels. At the end of the propagation interval, three dimensional position and velocity estimates, denoted $P_{orb}$ and $v_{orb}$, are available. Each is used to construct the appropriate extended fault vector, computed from an external measurement set $Z_{ePR}$ and $Z_{eDR}$:

$$Z_{ePR}^T = [Z_{PR}^T (P - P_{orb})^T] \quad (6)$$

where:
P is the Kalman filter estimated position; and
$Z_{PR}$ is the set of pseudo range residuals.

$$Z_{eDR}^T = [Z_{DR}^T (V - V_{orb})^T] \quad (7)$$

where:
V is the Kalman filter estimated velocity; and
$Z_{DR}$ is the set of delta range residuals.

Extended versions of the measurement gradient matrix H and the measurement variance matrix R are required:

$$H_{ePR}^T = [H_{PR}^T H_{orb}] \quad (8)$$

where $H_{PR}$ is the pseudo range measurement gradient matrix.

$$H_{eDR}^T = [H_{DR}^T H_{orb}] \quad (9)$$

where $H_{DR}$ is the delta range measurement gradient matrix.

Because position and velocity are directly estimated in the open-loop propagation, $H_{orb}$ has the following simple form:

$$H_{orb} = \begin{vmatrix} I & 0 \\ 0^T & 0 \end{vmatrix} \quad (10)$$

where:
I is a three dimensional identity matrix; and
0 is a three dimensional zero vector.

$$R_{ePR} = \begin{vmatrix} R_{PR} & 0 \\ 0 & P_{orbp} \end{vmatrix} \quad (11)$$

where: $P_{orbp}$ is the covariance matrix associated with the open-loop propagation of position by the Kalman filter.

$$R_{eDR} = \begin{vmatrix} R_{DR} & 0 \\ 0 & P_{orbv} \end{vmatrix} \quad (12)$$

where: $P_{orbv}$ is the covariance matrix associated with the open-loop propagation of velocity by the Kalman filter.

Note that the fault vector computation (eqs. 1 and 2) require that the R matrices (given by Eqs. 11 and 12) be inverted, and also that their square roots be taken. Because of the block-diagonal form of the extended matrices, this is relatively easy and straightforward, as given below:

$$R_{ePR}^{-1} = \begin{vmatrix} R_{PR}^{-1} & 0 \\ 0 & P_{orbp}^{-1} \end{vmatrix} \quad (13)$$

$$R_{eDR}^{-1} = \begin{vmatrix} R_{DR}^{-1} & 0 \\ 0 & P_{orbv}^{-1} \end{vmatrix} \quad (14)$$

Inverting $R_{PR}$ and $R_{DR}$ is straightforward, since they are diagonal matrices. However, inverting $P_{orbp}$ and $P_{orbv}$ requires more work. The Kalman filter can be mechanized in the popular U-D mechanization, as explained in an article by Bierman, G. J., "Measurement Updating Using the U-D Factorization", *Proceedings of the 1975 IEEE*, Conference on Decision and Control, incorporated herein by reference. If the Kalman filter is mechanized as described, however, the inverted calculations have already been done, as indicated below:

$$P = UDU^T \quad (15)$$

Equation (15) represents factorization of the covariance matrix, where U is an upper diagonal matrix, and D is a diagonal matrix. This decomposition of the covariance matrix permits the square root and the inverse square root of the covariance matrices to be found as:

$$P^{1/2} = UD^{1/2} \quad (16)$$

$$P^{-1/2} = UD^{-1/2} \quad (17)$$

Thus, a new and improved method and apparatus for maintaining the integrity of spacecraft based time and position using GPS is disclosed. In a preferred embodiment the apparatus includes a GPS receiver, a Receiver Autonomous Integrity Monitor (RAIM) processor coupled to receive signals from the GPS receiver, and a Kalman filter coupled to receive signals from the RAIM processor. GPS signals from GPS satellites are processed in a normal fashion to provide navigation information including position, velocity, time, etc. A spacecraft acceleration model is coupled to provide information to the Kalman filter to generate an extended fault vector and an open loop propagator is coupled to receive extended fault vector information from the Kalman filter and supply open-loop position and velocity errors to the RAIM processor. The RAIM processor and Kalman filter use the open-loop position and velocity errors to isolate and remove failing GPS satellites from consideration. Accordingly, a method and apparatus are disclosed which are capable of quickly and reliably isolating and removing failed or failing GPS satellites from the GPS position and time calculations used in navigation of a spacecraft.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method for maintaining the integrity of spacecraft based time and position using the Global Positioning System (GPS) comprising the steps of:
   providing a GPS receiver coupled to a Receiver Autonomous Integrity Monitor (RAIM) processor and a Kalman filter;
   receiving GPS signals from GPS satellites and processing the GPS signals in the GPS receiver to provide time and position information;
   periodically forming an extended fault vector in the Kalman filter with propagated open-loop position and velocity measurements;
   the step of periodically forming the extended fault vector includes inputting a spacecraft acceleration model into the Kalman filter; and
   using the extended fault vector to isolate and remove failing GPS satellites.

2. A method for maintaining the integrity of spacecraft based time and position using the Global Positioning System (GPS) as claimed in claim 1 wherein the step of periodically forming the extended fault vector includes forming the extended fault vector at intervals which are long relative to Selective Availability (SA).

3. A method for maintaining the integrity of spacecraft based time and position using the Global Positioning System (GPS) as claimed in claim 1 wherein the step of periodically forming the extended fault vector includes forming the extended fault vector at intervals of approximately 300 seconds.

4. A method for maintaining the integrity of spacecraft based time and position using the Global Positioning System (GPS) comprising the steps of:
   providing a GPS receiver coupled to a Receiver Autonomous Integrity Monitor (RAIM) processor and a Kalman filter;
   receiving GPS signals from GPS satellites and processing the GPS signals in the GPS receiver to provide time and position information;
   computing unit variance in the RAIM processor and using the unit variance to desensitize the Kalman filter to off-nominal conditions;

periodically forming an extended fault vector in the Kalman filter with propagated open-loop position and velocity measurements;

the step of periodically forming the extended fault vector includes inputting a spacecraft acceleration model into the Kalman filter; and using the extended fault vector to isolate failures of GPS satellites and failing GPS satellites.

5. A method for maintaining the integrity of spacecraft based time and position using the Global Positioning System (GPS) as claimed in claim 4 wherein the step of periodically forming the extended fault vector includes forming the extended fault vector at intervals which are long relative to Selective Availability (SA).

6. A method for maintaining the integrity of spacecraft based time and position using the Global Positioning System (GPS) as claimed in claim 4, wherein the step of periodically forming the extended fault vector includes forming the extended fault vector at intervals of approximately 300 seconds.

7. A method for maintaining the integrity of spacecraft based time and position using the Global Positioning System (GPS) as claimed in claim 4 wherein the step of computing unit variance includes computing pseudo ranges from the received time and position information.

8. A method for maintaining the integrity of spacecraft based time and position using the Global Positioning System (GPS) as claimed in claim 4 wherein the step of receiving GPS signals includes receiving carrier phase data and the step of computing unit variance includes computing delta ranges from differenced carrier phase data.

9. An apparatus for maintaining the integrity of spacecraft based time and position using the Global Positioning System (GPS) comprising:

a GPS receiver;

a Receiver Autonomous Integrity Monitor (RAIM) processor coupled to receive signals from the GPS receiver;

a Kalman filter coupled to receive signals from the RAIM processor;

a spacecraft acceleration model coupled to provide information to the Kalman filter to generate an extended fault vector;

an open loop propagator coupled to receive extended fault vector information from the Kalman filter and supplying open-loop position and velocity measurements to the RAIM processor; and the RAIM processor, Kalman filter, spacecraft acceleration model, and open loop propagator are all functions performed in a single processor embedded in the GPS receiver.

10. An apparatus for maintaining the integrity of spacecraft based time and position using the Global Positioning System (GPS) as claimed in claim 9 wherein the GPS receiver includes at least four channels for tracking GPS satellites.

* * * * *